Dec. 23, 1952     R. H. RINES     2,622,470
METHOD OF AND SYSTEM FOR INDICATING THE LIGHT
MODULATION IN A TRANSPARENT MEDIUM
Filed Jan. 7, 1948     2 SHEETS—SHEET 1

INVENTOR.
Robert H. Rines
BY
*David Rines*
Attorney

Dec. 23, 1952 R. H. RINES 2,622,470
METHOD OF AND SYSTEM FOR INDICATING THE LIGHT
MODULATION IN A TRANSPARENT MEDIUM
Filed Jan. 7, 1948 2 SHEETS—SHEET 2

INVENTOR
ROBERT H. RINES
By David Rines
ATTORNEY

Patented Dec. 23, 1952

2,622,470

UNITED STATES PATENT OFFICE 2,622,470

METHOD OF AND SYSTEM FOR INDICATING THE LIGHT MODULATION IN A TRANSPARENT MEDIUM

Robert H. Rines, Brookline, Mass., assignor of one-half to Hans Mueller, Belmont, Mass.

Application January 7, 1948, Serial No. 1,003

19 Claims. (Cl. 88—14)

1

The present invention relates to methods of and systems for light modulation, and more particularly modulation of the intensity of a light beam at ultrasonic frequencies. From a more specific aspect still, the invention relates to light shutters. The present application is a continuation-in-part of application Serial No. 608,781, filed August 3, 1945, now Patent Number 2,528,728, issued November 7, 1950.

A light shutter is a device that serves to vary in a controllable manner the intensity of a light beam passing through it. Early light shutters depended for their operation upon the principle of light diffractions.

In 1932, for example, Debye and Sears discovered that the waves of a beam of plane-polarized light issuing from an elongated slit, upon passing through a liquid medium transversed by ultrasonic waves generated by a quartz crystal in contact with the liquid medium became diffracted much in the same manner as light waves passing through a ruled optical grating (Proc. Nat. Acad. of Sci., vol. 18, 1932, page 410). A mathematical explanation of the diffraction patterns produced by this supersonic light shutter, not only when the medium is liquid, but also when it is solid, was proposed shortly thereafter by Raman and Nath (Proc. Ind. Acad, Sci., vol. 2, 1935, Part I, page 406; Part II, page 413; vol. 3, 1936, Part III, page 75; Part IV, page 119; Part V, page 459). According to this mathematical analysis, which has since had considerable experimental verification, the medium, whether liquid or solid, under the influence of ultrasonic vibration, may produce the same effect upon the beam of light as does an optical grating. The intensity of the diffracted light follows the variations in potential applied to the quartz ultrasonic generator.

Attempts were also made to observe visually the disturbances in the medium when vibrated at ultrasonic frequencies. Employing the "striation" or "Schlieren" optical method, Bergmann observed the effect produced by ultrasonics traveling through liquids (Z. Techn. Phys. vol. 17, 1936, page 512), and also through a solid vibrating quartz block (Press. Akad, Wiss. Sitz. 1935, page 222). At about the same time, Hiedemann and Hoesch, employing a different method, observed the same effects with the aid of a microscope (Z. Physik, vol. 96, 1935, page 268). Both of these methods, and the optical systems employed therewith, however, were indirect and complicated, and the phenomena observed were not sufficiently clear and sharp to enable the making of reliable measurements.

2

An object of the present invention, therefore, is to provide a new and improved, much simpler and more effective, optical method of and system for observing directly the effects of ultrasonics propagated into a medium.

Two types of vibrational waves have been found to be present in the medium: first, longitudinal ultrasonic vibrations in the direction of propagation of the ultrasound waves; and secondly, transverse waves shearing the solid medium. These two types of longitudinal and transverse waves are of different velocity, and they produce different diffraction patterns when a slit of polarized monochromatic light is transmitted through the medium. With the aid of the data obtainable from these different diffraction patterns, it is possible to calculate all the photoelastic and optical elastic constants of a solid medium of known Brewster fringe constant B and refractive index $n$: first, Young's modulus $\epsilon$; secondly, Poisson's ratio $\sigma$; and thirdly, the ratio $r$ of the photoelastic constants of the medium (Mueller and Murdock, "The Determination of Photoelastic Constants by Supersonic Diffraction," Photoelastic Conference, June 1942).

Because of the high precision required of the diffraction optical system, because the various diffraction orders are separated a considerable distance from one another, offering very limited areas of light intensity, however, the use of these diffraction patterns in the determination of these constants may be inconvenient. Diffraction methods, moreover, are restricted to use with monochromatic light.

Another object of the present invention, accordingly, is to provide a much less critical optical method of and system for obtaining data for yielding at least two of the said constants of the medium.

A further object is to provide a novel method and system which, unlike methods and systems employing diffraction patterns, shall provide a relatively large light intensity over a relatively large continuous area.

Still another object is to provide a new and improved method and system that may be used with chromatic light, whether visible, infra-red or ultraviolet.

Ultrasound waves of suitable frequency transmitted into a solid medium at one of its boundaries, travel through the medium to the opposite boundary, where they become reflected, theoretically to set up a standing-wave system that first, at one time, compresses and dilates alternate equally spaced sectional portions of the medium and then, after an interval, dilates and compresses the respective previously compressed and dilated portions. The medium can serve as a diffraction grating, therefore, at those particular successive times only when the various portions of the medium become compressed or dilated. No diffraction can take place during the intervals between those times, when the various portions, as they pass from compression to dilation, or the reverse, are undisturbed. The light in the diffraction orders is therefore stroboscopic, flicking on and off similarly to the operation produced by a shutter, but at twice the frequency of the ultrasound waves. Though it has heretofore been proposed to utilize this stroboscopic light for scientific measurements, these proposals, too, have been subject to the defect that only very little light is available in the diffraction orders (Becker et al., Phys. Z. vol 37, 1936, page 414; Bergmann, Ultrasonics, G. Bell and Sons, London, 1938).

Another object of the present invention, therefore, is to provide a new and improved light shutter or stroboscope that shall produce flashes having relatively a large light intensity and area at ultrasonic frequencies.

It has further been proposed to modulate the ultrasonic vibrations with an audio, video or other signal, thereby to obtain diffraction orders that shall become illuminated and disappear alternately in response to the modulated ultrasonic waves. This proposal enables detecting the modulating audio or video signal from the alternately illuminated diffraction orders. Such a light-modulation system, however, is again limited because of the small amount of light provided by the diffraction patterns.

In order to provide somewhat more light than is obtainable with the standing-wave diffraction systems, it has been proposed mechanically to vibrate a medium by relatively pushing and pulling its two ends. This does not involve the molecular vibration caused by the setting up of standing waves and, indeed, operates with a medium having dimensions comparable with the wavelength of the stressing vibration. To the attainment of this result, one end of a transparent medium may be rigidly secured to a fixed member and the opposite end of the medium may be rigidly attached to a magnetomotive or other vibrator. The medium is so shaped, as by reducing its thickness, that the distribution of stress therein caused by the confinement of the body between its two ends is not uniform and an initial mechanical stress, therefore, is continuously applied to the medium. A position of maximum stress thus lies in the most reduced portion of the medium and it is through this small and narrow area that a polarized light beam is passed. By applying additional mechanical stresses to the medium, as by causing the magnetomotive vibrator to vibrate at an audio frequency, the initial stress in the medium is altered and the polarized light is affected in a manner equivalent to the rotation of the plane of polarization of the light. The light emerging from the narrow reduced portion of the medium will thus penetrate an analyzer, adjusted for the best possible extinction of the light passing through the initially stressed medium, in varying intensities depending upon the degree of vibration of the magnetomotive vibrator.

Such a system is not adapted to permit the observation of and measurement of the effects of sound waves in a photo-elastic medium because there are no standing waves set up in the medium and because, even if standing waves could be produced in the medium, their effects would become completely distorted and masked by the shaping of the medium to produce a non-uniform stress distribution in the medium and a narrow, limited area of maximum stress. The dimensions of such a shaped medium, furthermore, must necessarily be of the order of magnitude of the wavelength of the mechanical vibrations, or at most a very low harmonic thereof, since, if the dimensions are made large compared to the wavelength, the shaping of the medium, so necessary for the operation of the system, will have no effect whatsoever.

Though such a system cannot therefore be used to observe and measure the effect of sound waves in a medium, the system may be used to modulate the narrow beam of light passing through the most reduced portion of the medium in response to a low frequency mechanical vibration. While this will provide a little more light area than is available with the previously described standing-wave diffraction systems, the high frequencies and wide side-band widths obtainable with the diffraction systems cannot be obtained with this system.

Still a further object of the present invention, therefore, is to provide a light shutter having the advantageous features of standing-wave systems but with unlimited light aperture which may extend throughout the complete area of the medium.

Another object is to provide a system that does not require a confined or rigidly secured medium, that does not operate with an initial stress or a non-uniform stress distribution within the medium and that does not require a specially shaped medium.

Other proposals for providing a larger light aperture have entailed untrasonically vibrating a medium constituted of a transparent quartz or other piezo-electric crystal. Some of these proposals have involved passing polarized light through the crystal along its optical axis; at the same time impressing an alternating electric field from an oscillator or otherwise upon the crystal in a direction at right angles to the optical axis. Since the crystal is optically active to start out with, the plane of polarization of the light incident upon the crystal, even in the absence of crystal vibrations or other externally produced strains, would become rotated to a new plane during the passage of the light through the crystal. The proposal therefore required that an analyzer be positioned beyond the crystal, adjusted at right angles to this new plane of polarization. The analyzer would naturally extinguish the light emerging from the crystal at times when the crystal is not vibrating.

Since the optical activity of the crystal would become modified in response to the strain produced by the alternating electric field, the degree of rotation of the plane of polarization of the light passing through the crystal would become correspondingly altered. According to this proposal, therefore, though the light passing through the anisotropic crystal would become extinguished at times when the crystal is quiescent, it would penetrate the analyzer during the vibration of the crystal.

As the intensity of the light thus traveling through the analyzer is relatively larger compared to that obtained with the aid of the before-described diffraction-pattern methods, it is possible to employ this system for limited transmission purposes. The crystal vibrations could be modulated in accordance with a modulating electric signal superposed upon the oscillations of the oscillator, different degrees of rotation of the plane of the incident plane-polarized light would be produced corresponding to the different vibrations of the crystal caused by the modulating signal, and these different degrees of rotation of the plane of the polarized light could be detected with the aid of the analyzer.

Since the solid medium, of necessity, however, is piezo-electric, the system would be frequency-sensitive and inoperative with the side-band-widths required in communication, television, and other similar applications. Not only is the medium crystalline, but it is also optically active. The detected signal would therefore be accompanied by considerable background noise. A system of this proposed character could not, moreover, be used either to determine the effects of ultrasonics on the medium or to find its optical properties. It could not, furthermore, be used with circularly polarized light; for, no matter how the medium were strained, circularly polarized light could not possibly produce any detectable rotation of the plane of polarization during the passage of the light along the optical axis of the crystal. With plane-polarized light, on the other hand, the orientation of the plane of polarization of the incident light would be immaterial, because the crystal is equally optically active in all planes parallel to its optical axis.

It is impossible, moreover, to obtain a truly large aperture of light with the use of a crystalline medium, because the frequency of vibration is determined by the thickness of the crystalline medium, and this can not be large compared to the wave length of the vibration.

These limitations are also present in other proposed systems where the light beam is sent through an axis of a crystalline medium other than the optical axis. Under such conditions, there is a further serious drawback since the light will become doubly refracted along such other axes because of the permanent double-refracting properties of such a medium. A plane analyzer cannot, therefore, completely extinguish the light passing through the medium in its quiescent condition, and there will consequently result considerable background noise.

Still a further object of the present invention, therefore, is to provide a new and improved light-modulation method and system that shall be substantially independent of frequency, that shall be accompanied by but little background noise, and that shall not depend on the principle of optical activity or change of optical activity and the rotation of the plane of polarization of the polarized light produced thereby.

A further object still is to provide a new and improved light-modulation system that shall depend for its operation, not upon rotating the plane of plane-polarized light, but rather upon depolarizing plane-polarized light into elliptically polarized light.

Other and further objects will be explained hereinafter and will be more particularly pointed out in the appended claims.

The invention will now be more fully described in connection with the accompanying drawings, in which.

Figures 1, 2:
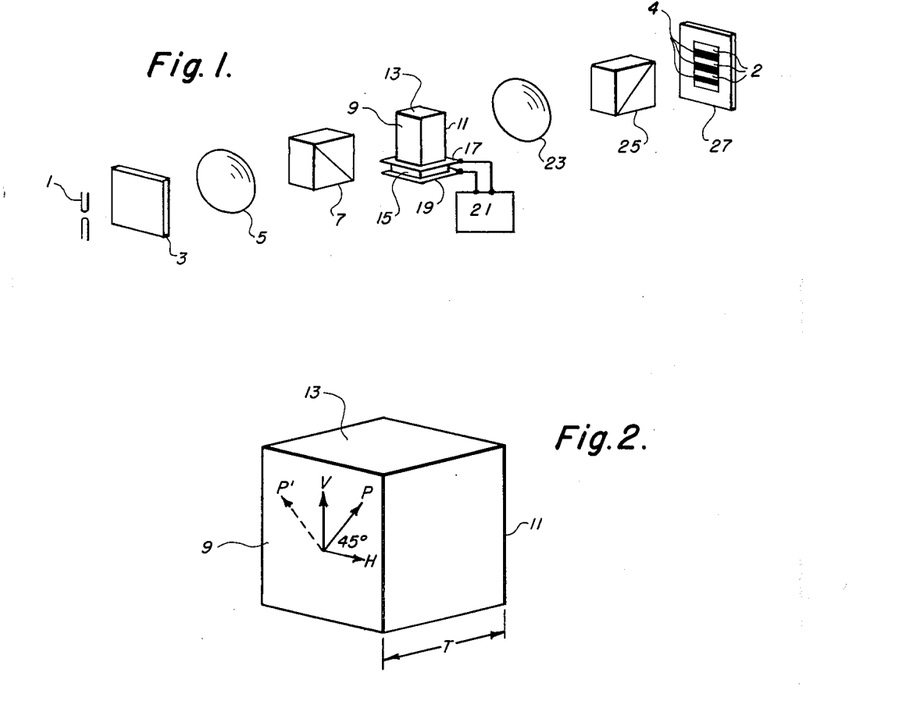
Fig. 1 is a diagrammatic view of circuits and apparatus constructed in accordance with a preferred embodiment of the invention.
Fig. 2 is an explanatory diagram.

A light source 1, such, for example, as a mercury arc, is provided to produce high-intensity light rays. As the invention is not, however, restricted to use with visible light, an infrared ray or even an ultra-violet filter 3, may, therefore, if desired, be employed. A filter 3 adapted to produce monochromatic visible light of any desired wavelength may also be employed, though the invention is operable with chromatic as well as monochromatic light.

The light waves are shown collimated by a lens 5 into a parallel beam or bundle of rays of cross-dimension corresponding to the cross-dimension of the lens 5. The beam or bundle of light rays is caused to pass through a plane polarizer 7 such, for example, as a Nicol prism or a piece of Polaroid, and thereafter to impinge upon a substantial area of the front surface 9 of a medium 13. The medium 13, of course, should be transparent to the light rays employed, whether visible, infra-red or ultraviolet, along the direction of travel of the light through the medium 13 between the front surface 9 and the preferably parallel rear surface 11. The transparent medium 13 is preferably of the same cross-dimension as the cross-dimension of the light beam. Any other well-known focusing system, such as a parabolic reflector, may be used to direct the rays upon the medium 13. The rear surface 11 of the transparent medium 13 is shown separated from the front surface 9 by a thickness T. The transparent medium 13 may be constituted of a glass or non-crystalline fused quartz block, or any other transparent solid or liquid. It may or may not be piezoelectric. For the present, it will be assumed, in the further description, that it is not piezoelectric but, on the contrary, that it is optically inactive, birefringent-free and strain-free.

The medium 13 may be vibrated molecularly in any desired way. According to the illustrated embodiment of the invention, the vibrations are produced by means of an ultrasonic vibrator. For the production of high-frequency ultrasonic waves, the vibrator may be constituted of a piezoelectric crystal 15, as of quartz, but it may also be of the magnetostrictive, magnetomotive or of any other suitable type.

The quartz crystal 15 may be vibrated at a predetermined frequency by connecting its two electrodes 17 and 19 to an oscillator 21. The period of vibration of the crystal 15 may be relatively low, say, several hundred kilocycles, more or less, or as high as ten megacycles, more or less. The ultrasonic vibrations of the quartz crystal 15 adjacent, for example, the bottom surface of the medium will therefore become transmitted or directed, with its wavefront substantially parallel to the bottom surface of the medium, into the medium 13 toward the top surface. The medium 13 may connected to or held in place on the crystal 15 in any desired way, as by cement or even by a layer of oil to aid in this transmission or direction.

Let it be assumed, for the moment, that the quartz crystal vibrates along its thickness dimension, so that it alternately elongates and contracts vertically. If the height dimension of the medium 13 is equal to a whole multiple of the wavelength of the ultrasonic waves in the medium, standing waves of ultrasonic frequency, as before stated, will theoretically be set up in the medium between its bottom and top surfaces. It is assumed that the medium 13 is of such a nature that, when it is vibrated molecularly to produce these theoretical standing waves therein, it becomes birefringent to the light passing therethrough along the direction of travel of the light through the medium which is substantially perpendicular to the direction of the ultrasoundwave wavefront between the bottom and top surfaces.

As the cross-dimension of the parallel beam or bundle of the plane-polarized light rays impinging upon the front surface 9 of the medium 13 corresponds to the cross-dimension of the lens 5, it is large compared to the dimension of the standing waves produced in the medium 13. This is to be contrasted with the conditions obtaining in the prior-art diffraction methods, and in the systems employing frequency sensitive crystalline media or shaped media.

After passing through the medium 13, and emerging from its rear surface 11, this large parallel beam or bundle of polarized light is shown in Fig. 1 focused by a lens 23 upon a screen 27. The lens 23 and the screen 27, of course, may be replaced by some other optical system, such as an ocular, a camera, a photocell, or any other suitable system for receiving and indicating the beam of light from the rear surface 11 of the medium 13.

An analyzer 25 is shown interposed between the lens 23 and the screen 27. It may be constituted of a piece of polarizing material oriented at right angles to the orientation of the polarizer 7. Under normal conditions, therefore, when the circuit of the oscillator 21 is open, and the crystal 15, therefore, is not vibrating, the polarized light passing through the medium 13 will be extinguished by the analyzer 25 to a degree depending only on the effectiveness of the polarizing and analyzing materials, with the result that the screen 27 will be dark.

The term "extinguished," of course, is used herein not only in its ordinary sense, as employed ordinarily in connection with visible light, but also more generally to denote also the more general phenomenon of blocking any of the light waves employed, whether or not visible.

When, however, the circuit of the oscillator 21 is closed, to render it effective to vibrate the quartz crystal 15, standing waves of ultrasonic frequency, as already explained, will be set up in the medium 13, between its bottom and top surfaces. Alternate horizontally disposed equally spaced sectional portions of the medium 13 will become compressed and dilated by oppositely phased components of the vibration waves, in consequence. These compressed and dilated sectional portions will be separated by portions of the medium 13 where the standing sound waves in the medium 13 will produce nodes. Corresponding changes in the refractive index will occur in the dilated and compressed portions of the medium 13; but the refractive index will remain unchanged at the nodes, since these nodal sections are not vibrating. The refractive-index changes will occur periodically in synchronism with the vibrations of the medium.

It has already been stated that the invention is not restricted to use with monochromatic light. In order to simplify the explanation, however, it will be assumed, for the present, that the light from the source 1 is actually monochromatic of wavelength $\lambda$.

Considering, for the moment, in the plane of the front surface 9 of the medium 13, any one of the horizontally disposed sectional portions of the medium 13, let it be assumed that a change $dn_1$ has occurred in its refractive index along the vertical direction V, and that a corresponding change $dn_2$ has occurred in its refractive index along the horizontal direction H, at right angles thereto. Let it further be assumed, for simplicity, that the plane of polarization of the light passing through the polarizer 7 upon reaching the plane of the front surface 9, is at 45 degrees to the vertical, as indicated at P in Fig. 2. This light, of amplitude $E_0$, may therefore be considered as having two equal-in-phase polarized components of amplitude $$\frac{E_0}{\sqrt{2}}$$

The vertical component $E_V$ is polarized along the vertical direction V, and the horizontal component $E_H$ is polarized along the horizontal direction H. The instantaneous values of these components, at any time $t$, may be represented by the following equations:

$$E_V = \frac{E_0}{\sqrt{2}} \cos \omega t$$

and $$E_H = \frac{E_0}{\sqrt{2}} \cos \omega t$$

where $\omega$ is the angular frequency of the light.

Since the change $dn_1$ in the index of refraction along the vertical direction V is different from the change $dn_2$ in the index of refraction along the horizontal direction H, these two polarized components will suffer different phase shifts during their passage through the medium 13. These phase shifts may respectively be represented by $$\Delta \phi_V = \frac{2\pi T}{\lambda} dn_1$$

and $$\Delta \phi_H = \frac{2\pi T}{\lambda} dn_2$$

where $\pi$ is the ratio of the circumference to the diameter of a circle.

The resultant of these two polarized components, upon emerging from the rear surface 11 of the medium 13, will therefore no longer, in general, be a plane-polarized wave. In general, the wave will be elliptically polarized, and its components will be respectively represented by $$E'_V = \frac{E_0}{\sqrt{2}} \cos (\omega t - \Delta \phi_V)$$

and $$E'_H = \frac{E_0}{\sqrt{2}} \cos (\omega t - \Delta \phi_H)$$

It is in this elliptically polarized form that the components of the elliptically polarized waves will pass through the crossed analyzer 25 on their way to the screen 27.

This operation is therefore not the same as that occurring with optically active crystals or other crystalline substances, as before described. The operation occurring with the optically active crystals depends upon rotating the plane of plane polarization. The operation occuring with permanently doubly refracting crystalline substances depends upon modifying the amount of double refraction. The operation of the present invention, on the other hand, depends upon depolarizing plane-polarized waves into elliptically polarized waves.

It has been explained that the analyzer 25 may be so oriented that, when no ultrasonic vibrations whatever are propagated into the medium 13, the screen 27 is dark. When the oscillator 21 causes the crystal 15 to set up standing ultrasonic waves in the medium 13, on the other hand, bright layers, striations, bands, regions or strips 2 will appear on the screen 27. The layers, striations, bands, regions or stripes 4 between alternately disposed light layers 2 will remain dark.

With the analyzer 25 adjusted in accordance with the above assumptions, so as to extinguish the light passing through the medium 13 at times when it is not vibrating, the dark stripes will correspond to the light passing through the nonvibrating or nodal portions of the medium 13. The light stripes 2, on the other hand, will correspond to the light which has become elliptically polarized during its passage through the compressed and dilated sections of the medium 13.

It is not, of course, essential that the analyzer 25 be so oriented as normally to extinguish the light passing through the medium 13. The analyzer 25 may be so oriented that, under normal conditions, when the medium is not vibrating, the screen 27 shall just be illuminated. The compressed and dilated sections of the medium 13, produced in response to the vibration of the medium 13, may periodically produce elliptically polarized light, the major axis of which is normal to the orientation of the analyzer 25, so that most of the light passing through these sections is extinguished when they produce such elliptically polarized light. The light stripes 2 will then correspond to the nodes, and alternately disposed dark stripes 4 to the compressed and dilated sections of the medium 13, produced in response to the vibration of the medium 13

In accordance wtih the present invention, therefore, the analyzer 25 may be adjusted initially so as normally either to extinguish the polarized light after its passage through the medium 13, or to permit the light to pass to the screen 27. The analyzer 25 may be adjusted to a degree such as initially to produce extinction and such that a slight change in the analyzing process in one direction, resulting from the action of the birefringent medium 13 to change the state of polarization of the light, will provide bands or sections 2 of illumination alternately with dark bands or sections upon the screen 27. The analyzer 25 may, on the other hand, be adjusted to a degree such as initially almost, but not quite, to extinguish the analyzed light on the screen 27 and such that an equal change in the analyzing process in the opposite direction, resulting from the action of the birefringent medium on the light, will produce dark bands or sections alternately with light sections 2 on the screen 27.

Since the light and dark layers 2 and 4 are produced periodically, in synchronism with the vibrations of the medium 13, the phenomenon, in reality, is produced stroboscopically. Because the frequency of the ultrasonic waves is many times greater than that of the flicker limit of the eye, however, the effect upon the observer will be the same as though the light layers 2 were produced with the aid of continuous light issuing from the analyzer 25.

The difference $(dn_1 - dn_2)$ in the changes of the index of refraction along the vertical and horizontal directions is known as the birefringence of the medium. It is proportional to the total phase shift suffered by the light in passing through the compressed and dilated sections of the medium 13. The intensity of illumination of the light stripes 2 is proportional to the square of the sine of half the phase shift $\phi$ suffered in passing through the medium 13.

The stronger the vibrations of the sound waves, the greater will be the birefringence and the greater the intensity of illumination of the light stripes 4. It is accordingly possible to regulate the light intensity in accordance with the signal produced by the vibrating quartz 15, as determined by the oscillations of the oscillator 21. A linear relationship has been found to exist between the light intensity and the signal amplitude produced by the quartz 15.

The operation above described has been upon the assumption that the height dimension of the medium 13 is equal to a whole multiple of the wavelength of the ultrasonic waves propagated through the medium 13 between its bottom and top surfaces. This, however, was for explanatory purposes only. I have found that, particularly at the higher frequencies, a medium of any arbitrary dimension may be employed, irrespective of whether or not it is a multiple of the wavelength, provided only that it is large with respect to the wavelength of the ultrasound waves. I have also found that such a photoelastic-shutter system is not frequency-sensitive, and the dimensions need bear no specific relationship to the wavelength of the ultrasound wave.

Though the flat area of the crystal 15 is shown in Fig. 1 as substantially equal to the cross-sectional area of the medium 13 into which it propagates the ultrasound waves, this is not essential. The medium 13 may have a cross-dimension many times the area of the crystal 15, though the birefringence effect resulting from the ultrasound waves will then not be produced strongly throughout the whole medium. To produce the birefringence effect throughout such a large medium, and thereby to obtain an unlimited light area, even several feet, a plurality of vibrators (not shown) similar to the crystal 15 may be employed in contact with successive portions of the medium 13, or a single large flat area crystal may be used. No slits or stops are necessary.

Figure 3:
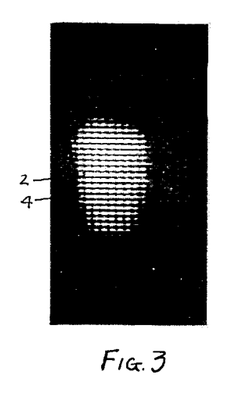
Fig. 3 is a reproduction of a photograph obtained according to the method, and employing the system, of the present invention, illustrating the effect produced upon a polarized beam of light in response to longitudinal compressional ultrasound waves imparted to a transparent solid medium through which the beam is passed.

The square-block-like-appearance reproduction in Fig. 3 of an actual photograph obtained with the system of Fig. 1 shows not merely the alternate horizontally-disposed light and dark layers or stripes 2 and 4, but also similar vertically disposed light and dark layers or stripes. These additional layers or stripes 2 and 4 are probably to be explained by the fact that, during the vibration, every elongation and contraction of the quartz crystal 15 in the vertical direction is automatically accompanied by a contraction and an elongation, respectively, in the horizontal direction. These, of course, are also transmitted into the medium 13. In addition to the theoretically predicted standing waves described above as set up in the medium 13 between the bottom and top surfaces in the vertical direction, therefore, standing waves appear to be set up also in the horizontal direction. Upon these standing waves at right angles to each other, moreover, there are doubtless superposed standing waves in still other directions, caused by reflection and other phenomena, the effects of which are not clearly shown in Fig. 3, though their existence appears to be betrayed in the photograph reproduced in Fig. 5. The result is not merely the before-described linear vibration of the medium 13, from top to bottom, but rather at least a two-dimensional vibration.

It is fortunate that, at least in the photograph reproduced in Fig. 3, the standing waves in the other directions do not interfere with the operation, according to the present invention, in the bottom-top direction. In this photograph, the standing waves at right angles to each other in the vertical and the horizontal directions are indicated as having very nearly equal effects upon the incident light. Since this incident light was described as polarized by the polarizer 7 at an angle of 45 degrees to the vertical, as represented at P, these standing waves appear to produce similar effects upon this type of polarized light, even though the vibrations of the two types of vibrations are not precisely the same. This may explain the block-like appearance of Fig. 3.

Figure 4:
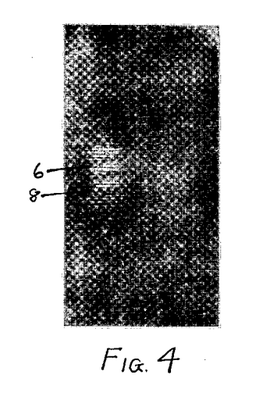
Fig. 4 is a reproduction of a similar photograph illustrating the effect of transverse shearing ultrasound waves, the light beam, however, being of different polarization.

With the dimensions and materials used, the changes of refractive index caused by the transverse shearing strain have been found to be smaller than those produced by the longitudinal compressional strain in the vertical direction. The bright striations 6 of Fig. 4 are therefore not so intense as those in the case illustrated in Fig. 3. Optimum results were found at substantially the 45 degree angle of polarization.

Instead of 45-degree polarization, the light issuing from the polarizer 7 may be polarized at any other desired angle. The effect of vertical polarization, for example, may be studied by considering the change of the refractive index resulting from the shearing strain produced in the medium 13 by its transverse vibrations as decomposed along two directions at right angles to each other along the plane of the surface 9. One of these may be an angle of 45 degrees with respect to the vertical, as may also be indicated at P, Fig. 2, and the other may be indicated at P'. The components of the vertically-polarized waves along the 45-degree directions P and P', during their passage through the medium 13, will suffer different phase shifts, depending on the changes in the refractive index along the two directions P and P'. The nature of the compressed and dilated sectional portions and the nodal portions of the medium 13 produced by the standing waves, of course, will be unchanged by this change in the angle of polarization of the light waves passing through the medium. For the reasons already given, therefore, owing to the biaxial birefringence thus produced, light layers will still appear on the screen 27 corresponding to the sheared sectional portions of the medium, and these will still be separated by dark layers corresponding to the nodal sectional portions of the medium 13.

These light layers and dark layers are respectively shown at 6 and 8 on an actual photograph, reproduced in Fig. 4, taken when employing light of vertical polarization in the system of Fig. 1.

It makes a difference, therefore, not only theoretically, but also in practice, whether the polarization of the incident waves lies in one plane or another plane. This again demonstrates that the operation, according to the present invention, is not the same as that with an optically active crystal, the operation of which depends upon rotation of the plane of plane polarization, and not the depolarizing of the plane-polarized waves into elliptically polarized waves.

The distances between the centers of the successively disposed light or dark striations or layers are respectively equal to one-half the wavelength $\lambda_l$ of the longitudinal compressional vibrations and one-half the wavelength $\lambda_t$ of the transverse compressional vibrations propagated vertically and horizontally, respectively, in the medium 13. The values of these wavelengths obtained by measurement may be used directly to find Young's modulus and Poisson's ratio.

As an example, ultrasound waves of a frequency $f=10$ megacycles were propagated, as illustrated in Fig. 1, into a sample 13 of plate glass $3.1 \times 1.4 \times 1.0$ centimeters, having a density $\rho=2.61$. Upon measurement, the wavelength $\lambda_l$ of the longitudinal waves in the vertical direction was found to be 0.532 millimeter and the wavelength $\lambda_t$ of the transverse waves was found to be 0.312 millimeter. Young's modulus was then calculated to be $7.65 \times 10^{11}$ degrees/cm.$^2$ from the formula $$\epsilon = \frac{\lambda_l^2 f^2 \rho (1+\sigma)(1-2\sigma)}{1-\sigma}$$

This value agrees with the values obtained for the same sample 13 by diffraction methods.

The ratio $m$ of the longitudinal to the transverse wavelengths, $$m = \frac{\lambda_l}{\lambda_t}$$

has been found to be in close agreement with the ratio of the displacements of the first diffraction orders produced by the transverse and the longitudinal waves. Poisson's ratio $\sigma$ may then be obtained from the equation $$\sigma = \frac{\frac{1}{2}m^2 - 1}{m^2 - 1}$$

The value 0.22 thus obtained agrees with the value obtained by diffraction methods for the same sample medium 13.

A very simple and almost instantaneous method of and means for finding these properties of the transparent medium are thus provided in accordance with the present invention.

Figure 5:
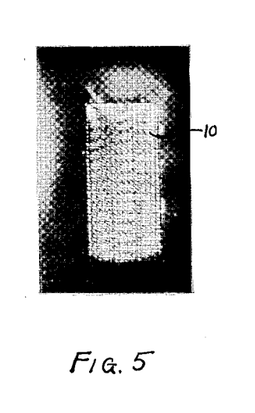
Fig. 5 is a reproduction of a similar photograph illustrating the effect produced by employing a medium the transverse dimension of which is comparable to the wavelength of the ultrasound waves in the medium.

When the transverse dimension of the medium 13 was reduced to a value comparable with the transverse vibrational wavelength, about 15 times, the complicated effects shown in the before-mentioned Fig. 5 appeared.

Though still providing a large continuous area of ultrasonic stroboscopic light, Fig. 5 shows signs of frequency sensitiveness. In addition to the light layers, intersecting patterns and scrolls 10 were found, probably resulting from numerous reflections within the medium.

Rough corners or edges have been found to introduce no uncertainties in the operation. The invention has heretofore been explained in connection with birefringent-free and strain-free media 13. It is preferable to employ media 13 of this character, and to adjust the analyzer 25 so as to obtain complete extinction before the vibrations are initiated in the medium. Extremely intense stroboscopic-light layers have thus been observed, for example, with non-crystalline fused-quartz media.

Crystalline substances having permanent birefringence, however, may also theoretically be employed. They also demonstrate light-intensity changes when subjected to ultrasonic waves, as described above. If an optically active medium 13, such as a piezo-electric crystal, is used, however, the plane of polarization of the light becomes rotated in passing through the medium 13. In order to detect the effect of the birefringence on the light emerging from the face 11 of the medium, it then becomes necessary to orient the analyzer 25 at right angles to the polarizer, and not so as to extinguish the light. It is then only that the birefringence effect, in addition to the optical activity, may theoretically be detected. In practice, the much stronger effect of the change in optical activity produced by straining the medium may prevent the detection of the effects of birefringence.

The use, in the system of Fig. 1, of a strain-free, optically-inactive, non-crystalline, isotropic medium 13 that is normally birefringent-free along the direction of travel of the light rays between the front surface 9 and the rear surface 11 of the medium 13, therefore, not only makes possible the measurements above-described and the observance of the effects of ultrasonics in such media, but it also provides a large continuous area of stroboscopic light which truly flashes from darkness to light of a high intensity. In the case of one crown-glass sample medium 13 of about the same dimensions as the sample previously discussed, the intensity change was found to be equal to one-tenth of the intensity of the mercury arc itself. Illumination of this order of intensity can be used, for example, when directed or projected as a beam by the lens 23 to photograph scientific or other phenomena in motion at ultrasonic or other high frequencies. The frequency of the oscillator 21 needs merely to be adjusted until the moving object appears to stand still.

If a quarter-wave plate is inserted in front of each polarizing device 7 and 25, so that circularly-polarized, instead of plane-polarized light is impinged upon the medium 13, and is analyzed after emerging therefrom, even stronger-intensity results occur. While some of the intensity resulting from the birefringence produced by the longitudinal waves is lost, this is apparently more than made up for by the light intensity resulting from the birefringence produced by the transverse waves. Waves having initially elliptical polarization may also be employed.

Figure 6:
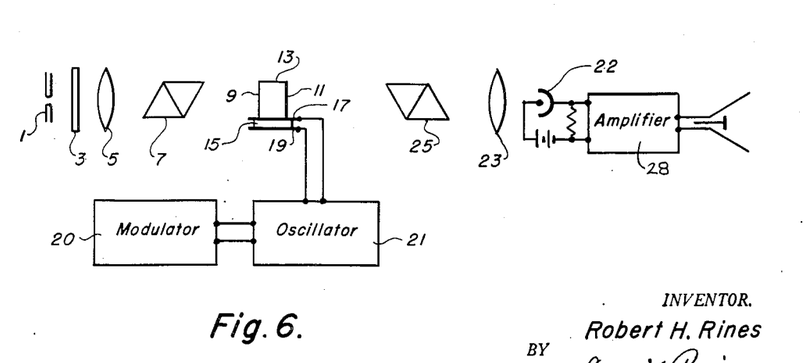
Fig. 6 is a diagrammatic view similar to Fig. 1, illustrating an application of the present invention to the transmission of signal intelligence.

Continuous-wave signals may be transmitted by the system of Fig. 1 in many ways, as by interrupting the circuit of the oscillator 21 with a key. Modulated audio or video signals may be transmitted by modulating the carrier frequency of the oscillator 21, as by means of a modulator 20. Since the thin high-frequency crystal 15 may be vibrated with wide side-bandwidths, the vibrations of the quartz crystal 15, oscillating at a high carrier frequency while in contact with the medium 13, are correspondingly modulated in accordance with the audio or video signal. The non-resonant, relatively large-dimensioned medium 13 has been found to respond sufficiently instantaneously to the modulated ultrasonic carrier, propagated thereinto from the crystal 15, to produce birefringence in response to the modulation signal. In reception, the lens 23 may therefore be caused to focus the birefringence-produced elliptically polarized light from the medium 13 onto some other light-receiving means than the screen 27. As illustrated in Fig. 6, for example, a photocell 22 may be employed to receive and produce an indication in response to the elliptically polarized light. In order to detect the modulation, the photocell 22 may be connected to an audio or video amplifier 28. Crystalline media 13 may also be used for the photocell or photographic detection of this light-modulation transmission, though with limitations of frequency sensitiveness, and accompanied by background noise or light.

Audio frequencies ranging from 40 cycles to 15,000 cycles have been used to modulate a ten-megacycle ultrasonic carrier with noiseless and distortionless results.

I have been able to send as many as three different modulated signals through the system of Fig. 6 simultaneously, with good reproduction, at the receiving end, of all three signals. The transmission may be effected by feeding one or more of the modulating signals to the same quartz or other ultrasonic vibrator 15. Such procedure tends, however, to overload the mechanical parts of the system.

The invention finds particular application also in television-projection systems such, for example, as the Scophony system, where liquid diffraction cells have heretofore been employed.

To control the volume and the performance of the light-modulation system of the present invention, it is desirable: first, properly to orient the plane of polarization of the polarizer; secondly, to control the operation of the piezo-electric carrier on and off the resonant frequency of the piezo-electric crystal; thirdly, to position the medium 13 so as to intercept more or less of the incident light; and fourthly, suitably to insert or remove a diaphragm, or to control the aperture of a diagram in the path of the light beam.

As a modification, if plane-polarized light is used, for example, the analyzer 25 may be provided with suitable phase-shifting plates. The elliptically polarized waves emerging from the compressed and dilated regions of the medium 13 will thus be properly analyzed, while permitting the plane-polarized light passing through the nodal-region portions of the medium to penetrate the analyzer 25. The use of a quarter-wave plate with the analyzer 25 may be particularly desirable, for example, where the thickness T of the medium is such as to produce exactly a ninety-degree phase shift between the components V and H of the incident light, circularly polarizing the light emerging from the compressed and dilated regions.

The description above has been simplified on the assumption that monochromatic light is used. Monochromatic light has its practical applications. The signalling system of Fig. 6, for example, could be used with infra-red or other invisible rays to provide added secrecy. The discussion above is equally applicable, however, to all wavelengths, even when employed simultaneously; that is, to chromatic light.

Modifications will occur to persons skilled in the art, and all such are considered to fall within the spirit and scope of the invention, as defined in the appended claims.

What is claimed is:

1. Apparatus for producing an indication of the optical effects of standing mechanical vibrational waves in a light-transparent molecularly vibrated medium having, in combination, a medium that is transparent to light along a predetermined direction and that, when molecularly vibrated at a predetermined mechanical vibrational wavelength to produce standing waves therein between a pair of opposed surfaces of the medium spaced from each other in a direction substantially perpendicular to the said predetermined direction a distance selected to correspond to several times the said wavelength, becomes birefringent to the light passing therethrough along the predetermined direction, a focusing device collimating light into a bundle of substantially parallel rays and having an aperture large compared to the said wavelength in order to pass the parallel rays through the portion of the medium disposed between the said pair of surfaces along the said predetermined direction, a polarizer polarizing the light prior to its passage through the medium, an analyzer for analyzing the light after its passage through the medium, the analyzer being adjusted so that a change in analyzing produced thereby in one direction will provide extinction of the analyzed light and a substantially equal change in the analyzing produced thereby in the opposite direction will permit the passage of the analyzed light, means for producing at one of the said surfaces molecular vibrations of the said predetermined wavelength directed into the medium with the mechanical vibrational wavefront substantially parallel to the said one surface toward the said other surface, the said other surface being a reflecting surface for said vibrations in order that the vibrations may be reflected therefrom to set up standing waves between the said pair of surfaces that produce a plurality of successively compressed, nodal and dilated portions in the medium substantially parallel to the said wavefront and corresponding to successive half-wavelengths of the standing waves, the compressed and dilated portions of the medium being thereby rendered birefringent to the light while the nodal portions of the medium remain unaffected by the standing waves, whereby the beam emerging from the analyzer produces a light pattern having a plurality of alternate light and dark stripes, and means in the path of the analyzed light for producing from the analyzed light a substantially simultaneous indication of the birefringent effects of the standing waves in the plurality of compressed and dilated portions of the medium between the said pair of surfaces upon the polarization of the parallel rays of light.

2. Apparatus for producing an indication of the optical effects of standing mechanical vibrational waves in a light-transparent molecularly vibrated medium having, in combination, a medium that is transparent to light along a predetermined direction and that, when molecularly vibrated at a predetermined mechanical vibrational wavelength to produce standing waves therein between a pair of opposed surfaces of the medium spaced from each other in a direction substantially perpendicular to the said predetermined direction a distance selected to correspond to several times the said wavelength, becomes birefringent to the light passing therethrough along the predetermined direction, a focusing device collimating light into a bundle of substantially parallel rays and having an aperture large compared to the said wavelength in order to pass the parallel rays through the portion of the medium disposed between the said pair of surfaces along the said predetermined direction, a polarizer polarizing the light prior to its passage through the medium, an analyzer for analyzing the light after its passage through the medium, the analyzer being adjusted to extinguish the light after its passage through the medium, means for producing at one of the said surfaces molecular vibrations of the said predetermined wavelength directed into the medium with the mechanical vibrational wavefront substantially parallel to the said one surface toward the said other surface, the said other surface being a reflecting surface for said vibrations in order that the vibrations may be reflected therefrom to set up standing waves between the said pair of surfaces that produce a plurality of successively compressed, nodal and dilated portions in the medium substantially parallel to the said wavefront and corresponding to successive half-wavelengths of the standing waves, the compressed and dilated portions of the medium being thereby rendered birefringent to the light while the nodal portions of the medium remain unaffected by the standing waves, whereby the beam emerging from the analyzer produces a light pattern having a plurality of alternate light and dark stripes, and means in the path of the analyzed light for producing from the analyzed light a substantially simultaneous indication of the birefringent effects of the standing waves in the plurality of compressed and dilated portions of the medium between the said pair of surfaces upon the polarization of the parallel rays of light.

3. Apparatus for producing an indication of the optical effects of standing mechanical vibrational waves in a light-transparent molecularly vibrated medium having, in combination, a medium that is transparent to light along a predetermined direction and that, when molecularly vibrated at a predetermined mechanical vibrational wavelength to produce standing waves therein between a pair of opposed surfaces of the medium spaced from each other in a direction substantially perpendicular to the said predetermined direction a distance selected to correspond to several times the said wavelength, becomes birefringent to the light passing therethrough along the predetermined direction, a focusing device collimating light into a bundle of substantially parallel rays and having an aperture large compared to the said wavelength in order to pass the parallel rays through the portion of the medium disposed between the said pair of surfaces along the said predetermined direction, a polarizer polarizing the light prior to its passage through the medium, an analyzer for analyzing the light after its passage through the medium, the analyzer being adjusted so that the analyzed light is almost but not quite extinguished, means for producing at one of the said surfaces molecular vibrations of the said predetermined wavelength directed into the medium with the mechanical vibrational wavefront substantially parallel to the said one surface toward the said other surface, the said other surface being a reflecting surface for said vibrations in order that the vibrations may be reflected therefrom to set up standing waves between the said pair of surfaces that produce a plurality of successively compressed, nodal and dilated portions in the medium substantially parallel to the said wavefront and corresponding to successive half-wavelengths of the standing waves, the compressed and dilated portions of the medium being thereby rendered birefringent to the light while the nodal portions of the medium remain unaffected by the standing waves, whereby the beam emerging from the analyzer produces a light pattern having a plurality of alternate light and dark stripes, and means in the path of the analyzed light for producing from the analyzed light a substantially simultaneous indication of the birefringent effects of the standing waves in the plurality of compressed and dilated portions of the medium between the said pair of surfaces upon the polarization of the parallel rays of light.

4. Apparatus as set forth in claim 1 the vibration-producing means of which comprises means for propagating ultrasonic waves into the medium.

5. Apparatus as set forth in claim 1 the vibration-producing means of which comprises piezoelectric means.

6. Apparatus as set forth in claim 1, all of the dimensions of the medium of which are large compared to the wavelength of the standing waves.

7. Apparatus as set forth in claim 2, the vibration-producing means of which comprises means for propagating ultrasonic waves into the medium.

8. Apparatus as set forth in claim 2 the medium of which is initially strain-free and the vibration-producing means of which comprises means for propagating ultrasound waves into the medium.

9. The apparatus claimed in claim 2 and in which the medium comprises a normally substantially birefringent-free block of glass.

10. The apparatus claimed in claim 2 and in which the medium comprises a normally substantially birefringent-free block of non-crystalline fuzed quartz.

11. Apparatus as set forth in claim 2 and in which the polarizer is a plane polarizer whose polarizing axis is oriented along a dimension of the medium.

12. Apparatus as set forth in claim 2 and in which the polarizer is a plane polarizer whose polarizing axis is oriented at substantially forty-five degrees with respect to a dimension of the medium.

13. Apparatus as set forth in claim 2 and in which the polarizer is a circular polarizer.

14. Apparatus as set forth in claim 2 and in which the polarizer is a plane polarizer, and the said birefringence produces a phase shift $\Delta\phi$, of the component of the polarized light in one direction at an angle to the plane of polarization of the light given substantially by the expression $$\Delta\phi_1 = \frac{2\pi T}{\lambda} dn_1$$

and a phase shift $\Delta\phi_2$ of the orthogonal component of the polarized light given substantially by the expression $$\Delta\phi_2 = \frac{2\pi T}{\lambda} dn_2$$

where T represents the thickness of the medium along the said predetermined direction of the light, $\lambda$ represents the said vibrational wavelength, and $dn_1$ and $dn_2$ represent, respectively, the changes in refractive index along the said one component direction and the said orthogonal direction in the said compressed and dilated portions of the medium.

15. Apparatus as set forth in claim 2 and in which the indication-producing means comprises a screen.

16. Apparatus as set forth in claim 2 and in which the indication-producing means comprises a light-responsive cell.

17. Apparatus as set forth in claim 2 and in which a further focusing device is employed to project the said analyzed light indication of the birefringent effects of the standing waves as a beam of substantially parallel rays of light.

18. Apparatus as set forth in claim 2 and in which the indication-producing means comprises means whereby the distance between the indicated birefringent effects of the standing waves in the said plurality of compressed and dilated portions of the medium may be measured, thereby to determine the wavelength of the standing waves in the medium.

19. In a system having a medium that is transparent to light along a predetermined direction and that, when molecularly vibrated to produce standing waves therein between a pair of substantially flat surfaces thereof spaced from each other in a direction substantially perpendicular to the said predetermined direction a distance corresponding to several times the standing-wave wavelength, becomes birefringent to the light passing therethrough along the predetermined direction, a method of producing an indication of the optical effects of the standing vibrational waves in the medium that comprises, collimating light into a bundle of substantially parallel rays of aperture large compared to the said wavelength, directing the bundle of parallel rays along a predetermined path, placing the medium in said predetermined path so that the said predetermined path of the directed rays substantially coincides with the said predetermined direction and light is directed through the portion of the medium between its said pair of surfaces, polarizing the light prior to its passage through the medium, analyzing the light after its passage through the medium, producing mechanical vibrations of the said wavelength at one of the said pair of flat surfaces of the medium, directing the vibrations at the said one surface into the medium toward the said other surface with the vibrational wavefront substantially parallel to the said one flat surface, the vibrations being reflected from the said other surface back toward the said one surface, in order to compress and dilate a plurality of successive portions of the medium disposed substantially parallel to the said one flat surface while maintaining unaffected nodal portions therebetween, thereby to render only the plurality of compressed and dilated portions of the medium birefringent to the light, and focusing the analyzed light from the plurality of compressed and dilated portions of the medium to provide a substantially simultaneous indication in the form of a light pattern having a plurality of alternate light and dark stripes corresponding to the birefringent effects of the standing waves in the plurality of compressed and dilated portions of the medium between the said pair of surfaces upon the polarization of the parallel rays of light, whereby the said optical effects in the medium may be indicated.

ROBERT H. RINES.

REFERENCES CITED

The following references are of record in the file of this patent:

UNITED STATES PATENTS

| Number | Name | Date |
|---|---|---|
| 1,694,661 | Meissner | Dec. 11, 1928 |
| 1,740,673 | Whitaker | Dec. 24, 1929 |
| 1,792,752 | Michelssen | Feb. 17, 1931 |
| 1,921,852 | Whitaker | Aug. 8, 1933 |
| 1,954,947 | Pajes | Apr. 17, 1934 |
| 1,997,371 | Loiseau | Apr. 9, 1935 |
| 2,064,289 | Cady | Dec. 15, 1936 |
| 2,155,659 | Jeffree | Apr. 25, 1939 |
| 2,234,329 | Wolff | Mar. 11, 1941 |
| 2,289,205 | Nagy | July 7, 1942 |
| 2,418,964 | Arenberg | Apr. 15, 1947 |

FOREIGN PATENTS

| Number | Country | Date |
|---|---|---|
| 299,884 | Great Britain | June 13, 1929 |
| 752,910 | France | July 31, 1933 |
| 717,747 | Germany | Feb. 21, 1942 |